United States Patent
Baker et al.

(10) Patent No.: US 8,429,441 B2
(45) Date of Patent: Apr. 23, 2013

(54) OPERATING PROCESSOR BELOW MAXIMUM TURBO MODE FREQUENCY BY SENDING HIGHER THAN ACTUAL CURRENT AMOUNT SIGNAL TO MONITOR

(75) Inventors: Brian A. Baker, Raleigh, NC (US); Justin P. Bandholz, Cary, NC (US); William H. Cox, Jr., Morrisville, NC (US); Sumeet Kochar, Apex, NC (US); Ivan R. Zapata, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 410 days.

(21) Appl. No.: 12/762,419

(22) Filed: Apr. 19, 2010

(65) Prior Publication Data

US 2011/0258477 A1 Oct. 20, 2011

(51) Int. Cl.
*G06F 1/04* (2006.01)
(52) U.S. Cl.
USPC ............................................. 713/600; 712/32
(58) Field of Classification Search .................. None
See application file for complete search history.

(56) References Cited

U.S. PATENT DOCUMENTS

| | | | |
|---|---|---|---|
| 5,630,110 A | 5/1997 | Mote, Jr. | |
| 6,230,279 B1 | 5/2001 | Dewa et al. | |
| 6,282,595 B1 | 8/2001 | Pan et al. | |
| 6,535,986 B1 | 3/2003 | Rosno et al. | |
| 6,564,328 B1 | 5/2003 | Grochowski et al. | |
| 7,404,095 B2 | 7/2008 | Brown et al. | |
| 7,536,578 B2 | 5/2009 | Pessolano | |
| 7,590,509 B2 | 9/2009 | Riedlinger et al. | |
| 7,650,527 B2 | 1/2010 | Rambo et al. | |
| 2007/0094522 A1 | 4/2007 | Lee | |
| 2008/0168287 A1 | 7/2008 | Berry et al. | |
| 2009/0138737 A1 | 5/2009 | Kim et al. | |

OTHER PUBLICATIONS

Intel "Intel® Turbo boost Technology in Intel® Core(TM) Microarchitecture (Nehalem) Based Processors", White Paper, Nov. 2008, 12 pages.
Venkatachalam, "Self-Calibrating Processor Speed: A New Feedback Loop for Dynamic Voltage Scaling Control", University of California, Irvine, CA, UMI No. 3269642, 2007, 158 pages.

*Primary Examiner* — Kenneth Kim
(74) *Attorney, Agent, or Firm* — Cynthia G. Seal; Jeffrey L. Streets

(57) ABSTRACT

A method, computer program product and system for controlling the maximum turbo mode of a processor in a turbo boost state. The method comprises limiting a maximum turbo mode available to the processor by over-reporting the amount of current drawn by the processor to the current monitoring feedback line to the processor, wherein the processor uses the over-reported current to maintain operation of the processor within performance specifications of the processor. An automatic calibration routine may be used to determine nominal amounts of current over-reporting that may be used to prevent the processor performance from exceeding the maximum turbo mode. In one embodiment, a digital potentiometer is included in the voltage regulator circuit to over-report the current as instructed.

17 Claims, 3 Drawing Sheets

```
┌─────────────────────────────────┐
│   Over-reporting the current   │
│  drawn by the processor to the │──── 50
│ current monitoring feedback line│
│        to the processor         │
└─────────────────────────────────┘
                 │
                 ▼
┌─────────────────────────────────┐
│    The processor using the      │
│    over-reported current to     │
│    maintain operation of the    │──── 52
│   processor within performance  │
│  specifications of the processor│
└─────────────────────────────────┘
```

OPERATING PROCESSOR BELOW MAXIMUM TURBO MODE FREQUENCY BY SENDING HIGHER THAN ACTUAL CURRENT AMOUNT SIGNAL TO MONITOR

BACKGROUND

1. Field of the Invention

The present invention relates to a processor having turbo modes that allow the processor to automatically increase or decrease its clock speed.

2. Background of the Related Art

A processor is a synchronous circuit that operates at a frequency measured in hertz (cycles per second) and know as the clock rate. After manufacturing, each processor is tested to determine the clock rate at which the processor can pass certain standards of performance. Accordingly, the processor is labeled and sold as operating at a given clock rate. A user, however, may alter the clock rate to achieve one or more objective. The clock rate may be slowed (i.e., "underclocking") to reduce the amount of waste heat generated by the processor or increased (i.e., "overclocking") to increase performance of the processor.

Certain processors made by Intel Corporation, for example the Core i5 and Core i7 processors, allow the processor's performance to be dynamically increased on demand. According to Intel, when the processor is operating below its thermal and electrical limits and the user's workload demands additional performance, the processor clock frequency will dynamically increase incrementally until the upper limit of the processor's clock frequency is met or until the maximum possible upside for the number of active cores is reached. Conversely, when any of the limits are reached or exceeded, the processor clock frequency will automatically decrease incrementally until the processor is again operating within its limits.

Processors that are capable of running at clock rates or frequencies greater than the base operating frequency, such as the Intel Core i5 and i7 processors discussed above, may be placed in a turbo boost state at the request of the operating system. For example, where the operating system is aware of ACPI (Advanced Configuration and Power Interface) states, the operating system may cause the processor to operate at a specific performance state. Optionally, the maximum processor power and frequency state (P0) may be used to put the processor into a turbo boost state where the processor may operate across a plurality of frequency steps (or turbo modes) above the base operating frequency. The base operating frequency is the mathematical product of an external clock rate and a clock multiplier, such that in one example an external clock rate of 133 MHz and a clock multiplier of 10 will operate the processor at 1.33 GHz. However, when the processor in a turbo boost state, the processor may operate above the base operating frequency in steps, such as frequency steps equal to the external clock rate of 133 MHz. Accordingly, when the processor is in the turbo boost state, the actual internal clock rate or operating frequency of the processor may be described by indicating the integer number of steps (i.e., bin upside) above the base operating frequency. A bin upside of "bin +1" means that the processor is operating at one frequency step above the base operating frequency (for example, 1.33 GHz+1*133 MHz=1.463 GHz), and a bin upside of "bin +2" means that the processor is operating at two frequency steps above the base operating frequency (for example, 1.33 GHz+2*133 MHz=1.596 GHz).

In a multi-core processor, the number of active cores at any given instant will dictate the upper limit of turbo modes. For example, a four-core processor having only one active core at a given instant may be able to operate at a higher turbo mode than when all four cores are active. For example, a core may be considered to be active if it is in the ACPI C0 or C1 power states, whereas a core may be considered to be inactive if it is in the ACPI C3 or C6 states. Therefore, a four-core processor may be rated for a turbo mode of 1/1/6/9 where the upper turbo mode for 4 active cores is bin +1, the upper turbo mode for 3 active cores is also bin +1, the upper turbo mode for 2 active cores is bin +6, and the upper turbo mode for 1 active core is bin +9. Other processors may have other ratings.

BRIEF SUMMARY

One embodiment of the present invention provides a method for controlling the turbo mode of a processor in a turbo boost state. The method comprises limiting a maximum turbo mode available to the processor by over-reporting the amount of current drawn by the processor to the current monitoring feedback line to the processor, wherein the processor uses the over-reported current to maintain operation of the processor within performance specifications of the processor.

Another embodiment of the invention provides a computer program product including computer usable program code embodied on a computer readable storage medium for controlling the turbo mode of a processor in a turbo boost state. The computer program product comprises computer usable program code for causing a voltage regulator circuit to over-report the amount of current drawn by a processor to a current monitoring feedback line of the processor, wherein the processor uses the over-reported current to maintain operation of the processor within performance specifications of the processor. In addition, the computer program product comprises computer usable program code for automatically calibrating, for each of a plurality of selected turbo modes of the processor, the amount of over-reported current that results in limiting the maximum turbo mode to the selected turbo mode.

A further embodiment of the invention provides a system for controlling the turbo mode of a processor in a turbo boost state. The system comprises a processor capable of increasing its clock rate by defined steps without exceeding a power dissipation limit, a voltage regulator circuit having an input that senses the current drawn by the processor and an output that reports an analog input signal to a current monitoring input of the processor, and a digital potentiometer in the voltage regulator circuit, wherein the digital potentiometer is controllable by a software interface.

DETAILED DESCRIPTION

Figure 1:
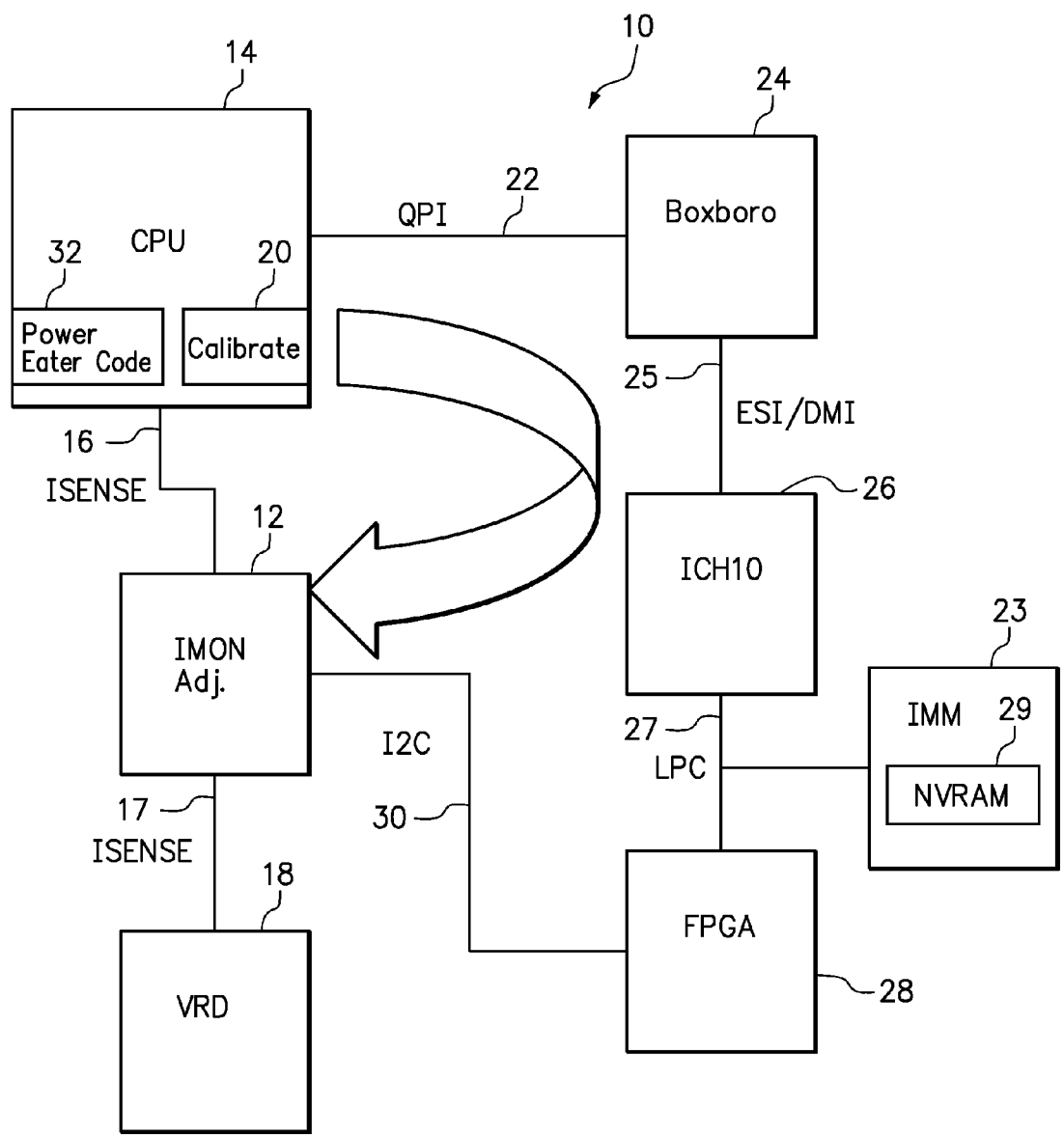
FIG. 1 is a block diagram of a computer system including a current adjustment circuit for over-reporting the amount of current drawn by a processor to a current feedback line to the processor.

One embodiment of the present invention provides a method for controlling the turbo mode of a processor in a turbo boost state. The method comprises limiting a maximum turbo mode available to the processor by over-reporting the amount of current drawn by the processor to the current monitoring feedback line to the processor, wherein the processor uses the over-reported current to maintain operation of the processor within performance specifications of the processor. Although a processor in a turbo boost state will have its turbo mode limited by power, temperature and current specification limits, as well as the number of active cores, the method of the present invention allows a user or software application to further limit the maximum turbo mode available to the processor. In other words, when the number of active cores, power, temperature and current specification limits are such that the processor would otherwise be able to increase performance to a given turbo mode, the method of the invention can be used to prevent the processor from running in that given turbo mode. The ability of limiting the maximum turbo mode of a processor may be beneficially used by power management applications to save or limit power consumption.

Optionally, the method may allow a user or software application to specify the amount of current over-reporting, specify the maximum turbo mode, or specify a power limit. Any user-specified amounts, modes or limits may be input through a software interface or through the use of hardware dip switches. In accordance with one or more embodiment of the invention, any of these limits may be enforced. In an optional embodiment, the user or software application provides the selected limit (such as a maximum turbo mode) to the operating system, which may then communicate the selected limit through an extensible firmware interface (EFI) to firmware that directly controls the amount of current over-reporting. The amount of current-over reporting is an amount that prevents the processor from entering a prohibited turbo mode (i.e., since the processor has exceeded, or would exceed, one or more of the specification limits of the processor).

In another embodiment, the method further comprises automatically calibrating the amount of over-reported current that results in a limited maximum turbo mode. Alternatively, the method may further comprise, for each of a plurality of selected turbo modes, automatically calibrating the amount of over-reported current that results in limiting the maximum turbo mode to the selected turbo mode. Such automatic calibration may be controlled by code that is executed by or through an extensible firmware interface.

In a further embodiment, automatic calibration may include: (a) setting an amount of current over-reporting, (b) executing power eater code, and (c) recording the maximum turbo mode achieved at the set amount of current over-reporting, and then repeating steps (a), (b) and (c) for a plurality of different amounts of current over-reporting. This data may be used to determine, for each turbo mode, a nominal amount of current-over reporting that establishes that turbo mode as the maximum turbo mode. The first and subsequent amounts of current over-reporting may vary according to the circuit capabilities and experience in making such calibrations. However, the amount of current over-reporting may optionally start at X Amps, and each subsequent amount of current over-reporting may be in steps of X Amps higher than the previous step. The power eater code is not required to perform any specific objective other than put a load on the processor that is sufficient to push the processor to its maximum turbo mode.

In a still further embodiment, the calibration data is stored in non-volatile random access memory (NVRAM), wherein it can be accessed by the extensible firmware interface. The calibration data may include all of the data from the automatic calibration steps, or a list of turbo modes and the nominal amount of current over-reporting associated with each turbo mode for preventing processor operation above the associated turbo mode. Accordingly, a maximum turbo mode can be enforced by identifying, within the calibration data, a nominal amount of current over-reporting that is associated with the selected maximum turbo mode. Then, the voltage regulator circuit (such as the voltage regulator down (VRD) circuit) is adjusted to over-report the current by the identified amount. For example, where the voltage regulator circuit includes a digital potentiometer in the current monitoring feedback line of the processor, the digital potentiometer is instructed to adjust the signal to the processor so that the current is over-reported by the identified amount. It is preferable that the voltage regulator circuit provide the true current draw of the processor, i.e., provide no over-reporting of current, unless both the processor is in a turbo boost state (i.e., performance state P0) and the user or software application has set a maximum turbo mode.

Another embodiment of the invention provides a computer program product including computer usable program code embodied on a computer readable storage medium for controlling the turbo mode of a processor in a turbo boost state. The computer program product comprises computer usable program code for causing a voltage regulator circuit to over-report the amount of current drawn by a processor to a current monitoring feedback line of the processor, wherein the processor uses the over-reported current to maintain operation of the processor within performance specifications of the processor. In addition, the computer program product comprises computer usable program code for automatically calibrating, for each of a plurality of selected turbo modes of the processor, the amount of over-reported current that results in limiting the maximum turbo mode to the selected turbo mode. Still further embodiments of the invention provide computer program products for performing any of the foregoing method embodiments.

An additional embodiment of the invention provides a system for controlling the turbo mode of a processor in a turbo boost state. The system comprises a processor capable of increasing its clock rate by defined steps without exceeding a power dissipation limit, a voltage regulator circuit having an input that senses the current drawn by the processor and an output that reports an analog input signal to a current monitoring input of the processor, and a digital potentiometer in the voltage regulator circuit, wherein the digital potentiometer is controllable by a software interface, such as an extensible firmware interface. Optionally, the processor is a multi-core processor.

FIG. 1 is a block diagram of a computer system 10 including a current adjustment circuit 12 for over-reporting the amount of current drawn by a processor 14 to a current feedback line 16 to the processor. The voltage regulator down (VRD) 18 senses the current drawn by the processor 14 and typically reports the current directly to the processor via the current feedback line 16. However, the present invention includes the current adjustment device or circuit 12, such as a digital potentiometer, to selectively adjust the signal to the processor. The current adjustment circuit 12, therefore, receives the processor current signal 17 from the VRD 18 and provides a current signal 16 to the processor. When the turbo mode of the processor is being limited, the current signal 16 is modified to over-report the current drawn. According to various embodiments of the invention, the current adjustment device or circuit may be used in a calibration routine as well as during operation of the processor in a turbo boost state.

During calibration, for example, a calibration software application 20 is executed for controlling the current adjustment device 12. Accordingly, the calibration routine 20 causes the processor 14 to communicate with the device 12 over a Quick Path Interconnect (QPI) 22, a Boxboro PCIe bus (northbridge) 24, an Enterprise Southbridge Interface (ESI) or Direct Media Interface (DMI) 25, I/O Controller Hub (ICH) or southbridge 26, a Low Pin Count bus 27, field-programmable gate array (FPGA) 28, and an Inter-Integrated Circuit (I2C) bus 30. Similarly, power eater code 32 is executed to cause the processor 14 to run at the maximum turbo mode available without exceeding any of the processor's specification limits. The calibration data is preferably stored in NVRAM 29 that resides in an Integrated Management Module (IMM) 23 coupled to the LPC bus 27.

Figure 2:
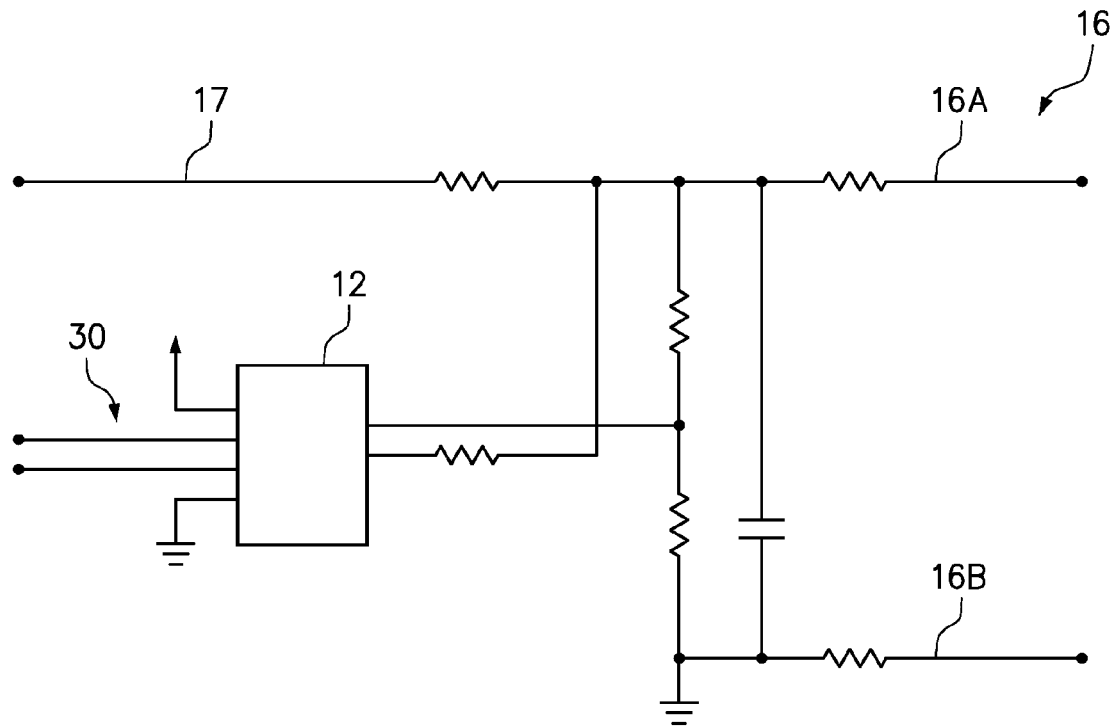
FIG. 2 is a diagram of a current adjustment circuit including a digital potentiometer.

FIG. 2 is a diagram of a current adjustment circuit including the digital potentiometer. The digital potentiometer 12 receives instructions from the calibration software application over the I2C bus 30. The amount of current drawn by the processor is input from the VRD to the digital potentiometer 12 over line 17. The potentiometer 12, when instructed to limit the turbo mode of the processor, will cause over-reporting of the current draw via line 16 (which is shown as a differential pair 16A, 16B).

Figure 3:
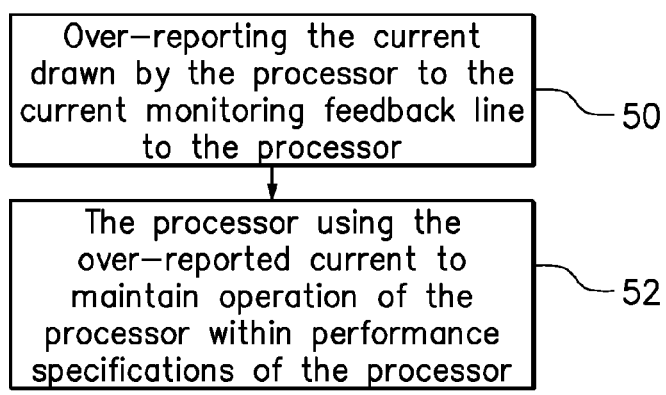
FIG. 3 is a flowchart of a basic method for limiting the maximum turbo mode of a processor.

FIG. 3 is a flowchart of a basic method for limiting the maximum turbo mode of a processor. In step 50, the current drawn by the processor is over-reported to the current monitoring feedback line to the processor. The processor then, in step 52, uses the over-reported current to maintain operation of the processor within performance specifications of the processor.

Figure 4:
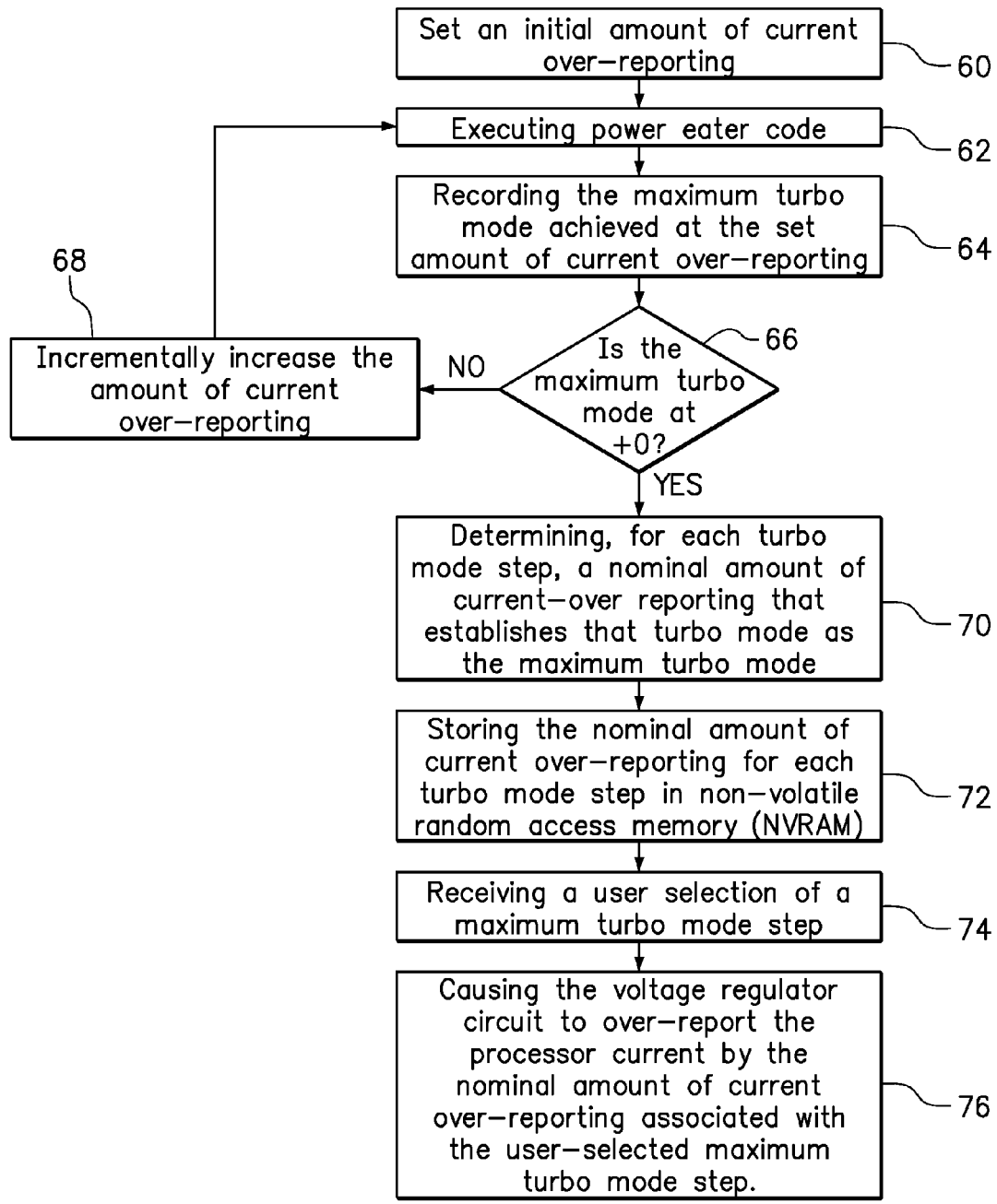
FIG. 4 is a flowchart of a method for automatically calibrating turbo mode limits.

FIG. 4 is a flowchart of a method for automatically calibrating turbo mode limits. Beginning in FIG. 4A, step 60 sets an initial amount of current over-reporting to the processor. In step 62, the method executes power eater code to load the processor and cause it to operate at a maximum turbo mode. While the power eater code is running, the current turbo mode is periodically read from a register that reports the current turbo mode. In step 64, the maximum turbo mode achieved at the set amount of current over-reporting is reported to the calibration routine and recorded. If it is determined, in step 66, that the maximum turbo mode has not reached +0 (i.e., the maximum turbo mode has come down from higher turbo modes, +1, +2, etc.), then step 68 incrementally increases the amount of current over-reporting, before repeating steps 62 and 64.

After repeating this process any number of times, step 66 eventually determines that the maximum turbo mode has reached +0 and the method moves to step 70 to determine, for each turbo mode step, a nominal amount of current-over-reporting that establishes that turbo mode as the maximum turbo mode. This determination can involve correlating the current over-reporting amounts to the resulting maximum turbo mode. Of all the current over-reporting amounts that achieve the next lower Turbo Mode, the current over-reporting amount that is the closest to nominal is selected. For example, the selected current over-reporting amount may be a value that is in the middle of the range of current over-reporting amounts that achieve the next lower Turbo Mode. In step 72, the nominal amount of current over-reporting associated with each turbo mode step is stored in non-volatile random access memory (NVRAM). Accordingly, the stored calibration data allows the calibration routine to be skipped until the system experiences a configuration change, such as a change of CPU, enabling/disabling cores, changing memory configuration or speed, significant changes in ambient temperature, or any system change that alters the power consumption profile of the CPU.

Having completed the calibration and stored the calibration data, it is possible to limit the maximum turbo mode available to a processor in a turbo boost state. In step 74, a user of software application enters a selection or preference indicating the desire to limit the maximum turbo mode of the processor. When a maximum turbo mode has been entered, and the processor is in a turbo boost state, step 76 causes the extensible firmware interface to instruct the digital potentiometer in the voltage regulator circuit to over-report the processor current by the nominal amount of current over-reporting associated with the user-selected maximum turbo mode. Accordingly, even through the number of active cores, power, temperature and current specification limits may be such that the processor would otherwise be able to increase performance to a given turbo mode (exceeding the maximum turbo mode indicated by the user or software application), the method of the invention will prevent the processor from running in that given turbo mode. This ability to limit the maximum turbo mode of a processor may be beneficially used by power management applications to save or limit power consumption.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
limiting the operating frequency of a processor to a turbo mode frequency that is lower than the maximum turbo mode frequency of the processor by over-reporting an amount of actual current drawn by the processor to the current monitoring feedback line to the processor, wherein the processor uses the amount of over-reported current to maintain operation of the processor within a predetermined power limit, temperature limit or current limit.

2. The method of claim 1, wherein the amount of over-reported current is user-selectable.

3. The method of claim 1, further comprising:
automatically calibrating the amount of over-reported current that results in the limited operating frequency.

4. The method of claim 1, further comprising:
for each of a plurality of selected turbo mode frequency steps, automatically calibrating the amount of over-reported current that results in limiting the operating frequency to the selected turbo mode frequency step.

5. The method of claim 4, wherein the automatic calibration is controlled by code that is executed by an extensible firmware interface.

6. The method of claim 4, wherein each of the plurality of selected turbo mode frequency steps increases the frequency bin by a factor of 133 MHz.

7. The method of claim 1, further comprising:
(a) setting an amount of current over-reporting;
(b) executing power eater code; and (c) recording the highest turbo mode frequency achieved at the set amount of current over-reporting; and repeating steps (a), (b) and (c) for a plurality of different amounts of current over-reporting; and for each turbo mode frequency step, determining a nominal amount of current-over reporting that establishes that turbo mode frequency.

8. The method of claim 7, further comprising:

storing calibration data in non-volatile random access memory (NVRAM), wherein the calibration data includes the nominal amount of current-over reporting for each turbo mode frequency step.

9. The method of claim 7, further comprising:

receiving a user selection of a turbo mode frequency step; and operating the processor with the nominal amount of current-over reporting associated with the user-selected turbo mode frequency step.

10. A computer program product including computer usable program code embodied on a computer readable storage medium, the computer program product comprising:

computer usable program code for causing a voltage regulator circuit to over-report the actual current drawn by a processor to a current monitoring feedback line of the processor operating at a turbo mode frequency step, wherein the processor uses the over-reported current to maintain operation of the processor within a predetermined power limit, temperature limit or current limit; and computer usable program code for automatically calibrating, for each of a plurality of selected turbo mode frequency steps of the processor, the amount of over-reported current that results in limiting the operating frequency of the processor to the selected turbo mode frequency that is lower than the maximum turbo mode frequency of the processor.

11. The computer program product of claim 10, wherein the computer usable program code is included in an extensible firmware interface.

12. The computer program product of claim 10, wherein the computer usable program code for automatically calibrating further comprises:

computer usable program code for setting an amount of current over-reporting, executing power eater code, and recording a highest turbo mode frequency step achieved at the set amount of current over-reporting, for each of a plurality of different amounts of current over-reporting; and computer usable program code for determining, for each turbo mode frequency step, a nominal amount of current-over reporting that establishes that turbo mode frequency step as the highest turbo mode frequency step.

13. The computer program product of claim 12, further comprising:

computer usable program code for storing calibration data in non-volatile random access memory (NVRAM), wherein the calibration data includes the nominal amount of current-over reporting for each turbo mode frequency step.

14. The computer program product of claim 12, further comprising:

computer usable program code for receiving a user selection of a turbo mode frequency step; and computer usable program code for causing the voltage regulator circuit to over-report the processor current by the nominal amount of current over-reporting associated with the user-selected turbo mode frequency step.

15. A system, comprising:

a processor capable of increasing its clock rate by defined turbo mode frequency steps without exceeding a power dissipation limit;

a voltage regulator circuit having an input that senses an actual amount of current drawn by the processor and an output that provides an analog signal to a current monitoring input of the processor; and a digital potentiometer in the voltage regulator circuit, wherein the digital potentiometer is controllable by a software interface to selectively over-report the amount of current drawn by the processor, wherein the analog signal limits the operating frequency of a processor to a turbo mode frequency that is lower than the maximum turbo mode frequency of the processor.

16. The system of claim 15, wherein the software interface includes an extensible firmware interface.

17. The system of claim 15, wherein the processor is a multi-core processor.

* * * * *